Jan. 13, 1970  A. L. MILLER ET AL  3,489,301
METHOD AND APPARATUS FOR HANDLING SCRAP METAL
Filed Dec. 11, 1967  2 Sheets-Sheet 2

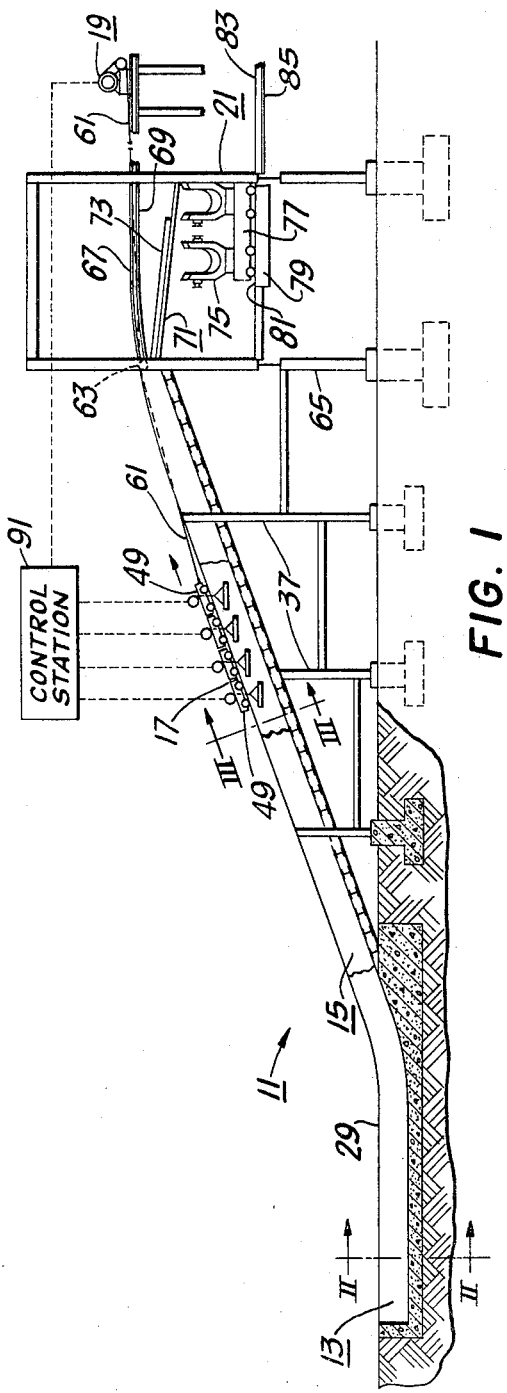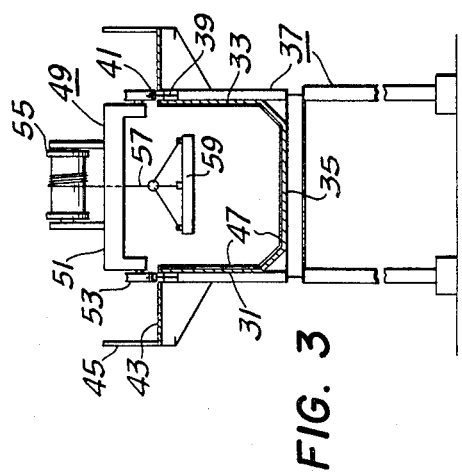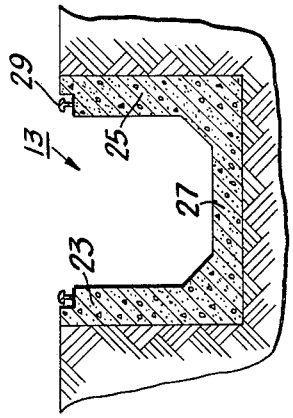

INVENTORS
A. LESLIE MILLER &
JOHN F. MODER, JR.
BY Sherman H Barber
their Attorney United States Patent Office 3,489,301
Patented Jan. 13, 1970

3,489,301
METHOD AND APPARATUS FOR HANDLING SCRAP METAL
Alexander Leslie Miller and John F. Moder, Jr., Pittsburgh, Pa., assignors to Koppers Company, Inc., a corporation of Delaware
Filed Dec. 11, 1967, Ser. No. 689,621
Int. Cl. B65g 47/92; B66c 17/02
U.S. Cl. 214—41                                                        11 Claims

ABSTRACT OF THE DISCLOSURE

The method and apparatus of the invention for handling scrap metal includes collecting scrap in a pit below ground level and removing the scrap by electromagnets mounted on cars, connected together as a train, moving on rails. The cars and scrap are moved up an inclined trough to a receiving station where the scrap falls onto a conveyor when the magnets are deenergized. The scrap moves on the conveyor and gravitates into scrap charging boxes located therebelow. The train returns to the initial loading point and the cycle is resumed.

In another embodiment of the invention, the train is elongated, but moves through only a preselected distance while the scrap moves in a practically continuous manner up the inclined trough, as the magnets are energized and deenergized cyclically.

BACKGROUND OF THE INVENTION

This invention relates to steelmaking and, more particularly, to method and apparatus for handling the scrap metal charge used in a metallurgical furnace. A typical furnace for which the invention is suited is a basic oxygen furnace; however, the invention is also suitable for use with electric arc, open hearth, rotary, and other types of metallurgical furnaces.

In the basic oxygen furnace process for making steel, for example, a quantity of hot metal is introduced into the furnace and then a known weight of scrap metal is charged into the furnace along with other additives such as lime, fluorspar, etc. Heretofore, it has been customary to store a quantity of scrap metal in a scrap gathering yard and, as needed, the scrap is loaded into boxes that are transported to a scale for weighing the scrap metal, and then the scrap is loaded into scrap charging boxes. The boxes are conveyed to the charging aisle near the furnace where cranes pick up the boxes and charge the scrap metal into the basic oxygen furnace. In other instances, after weighing, the scrap is charged into boxes that operate mechanically to dump the scrap into the furnace.

However, such prior art apparatus and method is inefficient, and time consuming, since considerable manpower is required to process the scrap in accordance with the prior art teaching. In contrast, the method and apparatus of the present invention handles scrap in a rapid, efficient, and safe manner with a considerable reduction in cost for producing a ton of steel.

SUMMARY OF THE INVENTION

The invention comprises an open receptacle for receiving and holding scrap metal, and a trough disposed axially of the receptacle and inclined upwardly from the horizontal. The trough communicates with the receptacle and terminates at an upper level of a scrap receiving and distributing structure. A plurality of interconnected cars or support platforms, forming a train, move along the receptacle and trough; each platform supporting a powered winch and with a wire cable supporting a scrap metal holding device. The train is movable by means of a hauling winch and a cable attached to one of the cars of the train. The scrap metal is deposited upon an apron structure, disposed at the upper level of the distributing structure, and the scrap metal discharges into scrap charging boxes therebelow; the train returning to the initial point for resumption of the cycle.

For a further understanding of the invention, and for advantages and features thereof, reference may be made to the following description in conjunction with the accompanying drawings which show, for the purpose of exemplification, embodiments of the invention.

BRIEF DESCRIPTION OF THE DRAWINGS

In the drawings:

FIG. 1 is a schematic elevational view of apparatus in accordance with the invention that is suitable for practicing the method of the invention;

FIG. 2 is a sectional view along line II—II of FIG. 1;

FIG. 3 is a sectional view along line III—III of FIG. 1; and

DETAILED DESCRIPTION

Figures 3A, 4:
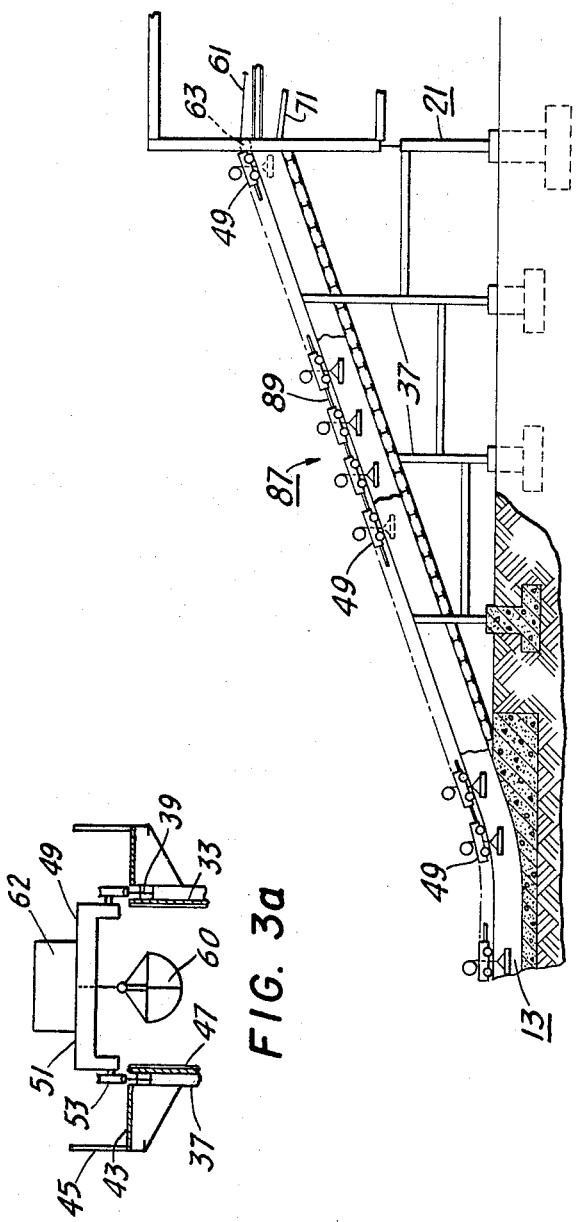
FIG. 3a is a view, like FIG. 3, showing another form of material holding mechanism.
FIG. 4 is a schematic elevational view of another embodiment of the apparatus in accordance with the invention.

Referring to the drawings, FIG. 1 illustrates schematically scrap handling apparatus 11 that includes a scrap metal collecting pit 13, a scrap conveyor trough 15, an electromagnet scrap train 17, a scrap train hauling winch 19, and a scrap receiving and distributing structure 21.

The scrap metal collecting or gathering pit 13 comprises an elongate open top trough having parallel side walls 23, 25 connected to a flat bottom 27. The pit 13 is, preferably, imbedded in the ground, and the top of the parallel side walls 23, 25 are just about level with the ground. Each side wall 23, 25 supports a track 29 extending therealong.

The scrap conveying trough 15 is arranged axially of and generally coplanar with the scrap metal collecting pit 13. The trough comprises parallel side members 31, 33, that are connected to a substantially flat bottom 35 that is generally about as wide as the collecting pit 13. The side walls 31, 33 and the bottom 35 are structurally supported in a conventional manner, such as by bent frames 37 (FIG. 1) and adjacent the top edge of each side member 31, 33 is a structural I-beam 39, which supports a rail 41, that is a continuation of rail 29 disposed on the side walls 23, 25 of the scrap collecting pit 13. Adjacent each rail 41 is a walkway 43 with conventional hand and guard rail 45 for operating personnel when making inspection or maintenance trips along the conveying trough. The side members 31, 33 and bottom 35 are, preferably, internally fitted with a suitable abrasion resistant replaceable liner 47 of the type that is known and available to those skilled in the art.

The scrap train 17 comprises a plurality of individual scrap handling cars 49 that are interconnected by suitable coupling means to form a scrap handling train. Each car comprises a bridge structure or platform 51, and axle-wheel assemblies 53 that are journaled to the bridge structure 51. The wheels of such axle-wheel assemblies 53 cooperate with both the rails 29 on the side walls 23, 25, and the rails 41 located adjacent the side members 31, 33. Atop the bridge or platform structure 51, there is mounted a hoisting mechanism 55, which is equipped with a cable 57 that carries an electromagnet 59. The electromagnet 59 is of conventional design and may be either round or rectangular in shape, or have any other shape that is preferred.

Those skilled in the art will recognize that the purpose of the electromagnet 59 is to grasp and hold a quantity of scrap metal, and it will be evident to those skilled in the art that other scrap metal grasping and holding mechanisms, such as grab buckets 60, actuated by suitable mechanism 62; of course other mechanism may be used, if preferred, instead of the electromagnet 59.

The lead car of the train 17 is connected to another cable 61 that is wrapped around the drum portion of the hauling winch 19, also suitably mounted to the structure 21. The cable 61 also passes over one or more idler pulleys 63 mounted to the structure 21. Thus, by actuating the hauling winch 19, the train 17 moves up and down the rails 41 and 29 in the manner described hereinafter and moves scrap from the pit 13 up the inclined trough 15.

The scrap receiving and distributing structure 21 comprises a frame structure 65, that is firmly fixed to the ground, and that has at least three operating levels. An upper operating level comprises rails 67 that continue the rails 43 in a generally horizontal or slightly upwardly sloping manner; the rails 67 being suitably supported by beams and girder structures 69 that are tied into the frame structure 65. At the level of the bottom 27 of the conveyor trough 15, there is a second and lower level 71 in the structure 21 that is comprised of a sloping apron conveyor 73. Such conveyor 73 may or may not be power driven as desired and receives the scrap loads from each magnet, or other grasping device, when the same is deactuated, and conveys the scrap to a location above conventional scrap charging boxes 75, positioned on a third and lower level.

The scrap charging boxes 75 are supported on a movable scrap charging car 77, which is positionable on a floor scale 79 located beneath the apron conveyor 73. The floor scale 79 is provided with conventional rails 81 to accommodate the wheels of the charging car 77, and the rails 81 are at substantially the same level as rails 83 on the adjacent charging floor 85.

In the embodiment of the invention shown in FIG. 4, the entire structure is substantially the same as that described hereinbefore, except that the scrap train 87 (FIG. 4) comprises a plurality of scrap handling cars 49 (previously described herein) that are interconnected by draw bars 89, so that the cars 49 are spaced further apart than in the embodiment of the invention shown in FIG. 1.

As carried into practice, the present invention is used to move scrap metal from a gathering yard, or scrap gathering pit, to a location where such material is loaded into scrap charging boxes that are movable to the furnace charging area. Magnetic charge materials, including steel scrap, sheets, bales, coils, turnings, bundles, butts, pellets, etc. such as is generally classified as scrap, is delivered to the scrap metal collecting pit 13 by mobile carriers, such as railroad cars or trucks. The scrap is unloaded or dumped into the pit, or it may be stored in piles or bins for classifying and later use when it is dumped into the pit. Preferably, the scrap collecting pit 13 is located below yard level to accommodate dumping from cars and trucks, or pushing scrap metal into the pit by other types of mobile yard equipment.

When it is desired to remove scrap material from the pit, to fill the scrap charge boxes for charging a furnace, the cars of the scrap train 17 (FIG. 1) gravitate down the conveyor trough and along the side walls of the pit; the magnets 59, or other grasping device, of each car 49 in the train 17 (a train comprises two or more cars 49 that are coupled together) are lowered, under control of the winch 55 from a central control console 91, actuated and hoisted again by the winch 55 with a load of scrap dependent therefrom; the hauling winch 19 then operates under control of the console 91 to pull the scrap train 17 up the inclined rails 41. The scrap material is both lifted and dragged up the conveyor trough 15. The scrap will not be completely lifted by the magnets 59, so that it does not contact the sides of the trough, but it will be both lifted and dragged up the conveyor trough simultaneously. This is desirable to insure efficient, safe, reliable, and rapid conveying of scrap to the elevated scrap receiving and distributing structure 21.

As the scrap holding devices pass over the apron conveyor 73, each device is deactivated so that its load of scrap falls onto the apron conveyor. Thence, the scrap moves on the conveyor 73 and gravitates into one of the scrap charging boxes 75 positioned therebelow; the scrap metal being loaded into each charging box is weighed as the box is loaded, and, when all of the scrap holding devices have released their respective loads of scrap, the train descends to its initial position and repeats the cycle described herein.

The loaded scrap charging boxes are then moved to the furnace charging area (not shown) and returned empty to receive another load of scrap.

If electric furnaces are used instead of BOF type furnaces, the scrap gravitates from the apron conveyor 73 into conventional drop-bottom furnace charging buckets (not shown) instead of the scrap charging boxes 75, suggested in FIG. 1.

The scrap train 87, shown in FIG. 4, operates in a different manner to insure a practically continuous movement of scrap along the conveyor trough.

The train 87 is long enough to extend from the collecting pit 13 to the scrap receiving and distributing structure 21. All of the magnets 59, or other scrap holding devices, in the train 87 are activated and deactivated simultaneously, and the train 87 moves along the trough 15 and pit 13 only a preselected distance, which may be 10, 15, or 20 feet, or any other preselected distance, depending upon the circumstances of the particular installation. When the scrap holding devices are activated and each device is carrying its respective load of scrap, the train moves through the preselected distance. Then, all of the scrap holding devices are deactivated simultaneously and disengage their respective loads of scrap. The train then returns to its initial position, and the scrap holding devices are reactivated to commence a new cycle of operation. The scrap will not slide down the trough because of friction, since the slope of the trough will be somewhat less than the angle of repose of the scrap metal.

Thus, those skilled in the art will recognize that in the embodiment of the invention shown in FIG. 4, the scrap trough is practically full of scrap metal at all times, and, although the scrap moves along the trough intermittently, practically a continuous flow of scrap metal onto the apron conveyor is achieved.

A feature of the present invention is that scrap metal can be delivered practically continuously to the scrap charging boxes, thereby making it possible to always have sufficient scrap ready for several furnaces operating simultaneously.

A feature of the present invention is that the scrap metal is conveyed more safely from the collecting pit to the charging area.

A feature of the invention is that either trucks or railroad cars, or other yard equipment, may be used to dump scrap directly into the collecting pit, and the scrap may be removed from the pit without further manual handling.

A feature of the invention is that the amount of scrap that can be moved by the train during each cycle is dependent on the number of cars in the train and the size of the magnets. Thus, greater amounts of scrap can be moved per unit of time with the apparatus of the invention.

A feature of the invention is that it is not necessary to provide a scrap box transfer car and propelling mechanism, nor overhead cranes to handle such scrap transfer boxes. In accordance with the invention, scrap is loaded directly into the scrap charging boxes from the storage area.

A feature of the invention is that the overall time to prepare and deliver scrap material to a furnace is significantly reduced, thereby significantly improving the efficiency of furnace process.

What is claimed is:

1. Apparatus for handling scrap metal comprising:
   (a) a receptacle for receiving and holding scrap metal;
   (b) a trough inclined upwardly from the horizontal and communicating with said receptacle;
   (c) a plurality of interconnected structures movable along said receptacle and said trough, each said structure supporting means for grasping and holding a portion of said scrap metal;
   (d) means for moving said structures along said trough and said receptacle and for dragging said scrap up said inclinded trough;
   (e) first means ararnged in an elevated position for receiving and distributing said portions of scrap when released from said scrap holding means; and
   (f) scrap receiving second means located beneath said first means for receiving said scrap portions and for moving said scrap to another area.

2. The structure of claim 1 wherein:
   (a) said receptacle is a pit below ground level; and
   (b) said means for grasping said scrap metal is an electromagnet.

3. The structure of claim 1 wherein:
   (a) said means for grasping and holding said scrap metal is a grab bucket.

4. The structure of claim 1 wherein:
   (a) said movable structures are platforms having wheels engaging rails located on said pit and said trough; and
   (b) the grasping means supported on each platform comprises a powered hoisting mechanism and an electromagnet suspended from a hoisting cable operatively connected to said hoisting mechanism.

5. The structure of claim 1 wherein:
   (a) said movable structures are platforms equipped with wheels engaging rails mounted to said pit and said trough; and
   (b) said grasping means supported on each platform comprises a powered hoisting mechanism and a grab bucket suspended from a hoisting cable operatively connected to said hoisting mechanism.

6. The structure of claim 1 wherein:
   (a) said means to receive and distribute said scrap portion comprises a powered roller apron.

7. The structure of claim 1 wherein:
   (a) said scrap reeciving means comprises scrap charging boxes.

8. The structure of claim 1 wherein:
   (a) the means for moving the structures is a hauling winch with wire cable attached to one of the interconnected structures.

9. Apparatus for handling scrap metal comprising:
   (a) a receptacle for receiving and holding scrap metal;
   (b) a trough inclined upwardly from the horizontal and communicating with said receptacle;
   (c) a plurality of interconnected structures movable in a scrap loading and moving cycle along said receptacle and said trough, each said structure supporting means for grasping and holding a portion of said scrap;
   (d) means to simultaneously actuate said scrap grasping and holding means;
   (e) means for moving simultaneously said structures and the scrap held by each structure from a first position to a second position through a preselected distance along said receptacle and said trough and for dragging said scrap up said inclined trough;
   (f) meanns to simultaneously deactuate said scrap grasping and holding means when said structures reach said second position;
   (g) means to return said structures to said first position for resumption of the scrap loading and moving cycle;
   (h) first means disposed adjacent the upper end of said trough for receiving the portions of scrap discharged from said grasping and holding means; and
   (i) second means arranged below said first means for receiving said scrap portions and for moving said scrap to another area.

10. The method for handling scrap metal comprising the steps:
    (a) collecting scrap metal in a receptacle;
    (b) moving a plurality of interconnected support structures along said receptacle and along a trough communicating with said receptacle a preselected distance;
    (c) grasping and holding simultaneously portions of said scrap by means of mechanisms installed on each said movable structures and dragging said scrap along said trough as said structures move from an initial point toward a termination point, both points being along said preselected distance;
    (d) releasing simultaneously said portions of scrap when said structures reach said termination point;
    (e) returning said structures to an initial point and repeating the steps (b) through (d);
    (f) continuing said cyclical movement of scrap in said trough whereby the same is discharged therefrom;
    (g) collecting said discharged scrap in charging boxes; and
    (h) moving said charging boxes to another area.

11. The cyclical method for handling scrap metal comprising the steps:
    (a) collecting scrap metal at a first location;
    (b) moving a plurality of interconnected support structures forming a train along said first location and along a trough communicating with said area;
    (c) grasping and holding simultaneously portions of said scrap by means of mechanisms installed on each said movable structure;
    (d) moving said scrap along said trough;
    (e) releasing said scrap as each structure reaches a termination point at the end of said trough;
    (f) receiving and distributing said released scrap into receptacles;
    (g) returning said train to an initial position at said first location; and
    (h) repeating the steps in a cycle.

References Cited

UNITED STATES PATENTS

| 405,325 | 6/1889 | Rogers | 214—86 |
| 2,675,718 | 4/1954 | Finney | 214—41 XR |

FOREIGN PATENTS

| 142,569 | 2/1960 | Russia. |
| 142,570 | 2/1960 | Russia. |

ROBERT G. SHERIDAN, Primary Examiner

U.S. Cl. X.R.

198—41; 212—11; 214—86, 152